VARIABLE LIMITER FOR ANALOG COMPUTER USING A FIXED ZENER DIODE

Filed Feb. 9, 1961

*INVENTOR.*
H. C. HOFFMAN, JR.

BY W. J. Duesenberry
E. Hodges
ATTYS.

United States Patent Office 3,153,152

Patented Oct. 13, 1964

3,153,152

VARIABLE LIMITER FOR ANALOG COMPUTER USING A FIXED ZENER DIODE

Henry C. Hoffman, Jr., Catonsville, Md., assignor to the United States of America as represented by the Secretary of the Navy Filed Feb. 9, 1961, Ser. No. 88,234
6 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to the analog computer art and more particularly to a device for limiting the input or output of an amplifier used in an analog computer.

The use of diodes in the analog computer art have been well known. FIG. 1 illustrates a well known limiter circuit generally used to limit the output of the amplifier. The limiter circuit utilizes a diode with a breakdown when the diode starts to conduct. The diode impedance characteristics change from a finite value to zero at the breakpoint. The breakpoint of the diode may be changed by adding or reducing the bias battery voltage.

Many simple function generators based on various combinations of the limiter circuits may be fabricated on most multipurpose analog computers. These circuits can simulate the operating characteristics of many non-linear devices. Diode limiter circuits can also be applied to integrators and other operational amplifiers.

With the limiter circuits having so many possibilities it is quite evident that the use of batteries to bias the diodes results in a complicated bulky circuit requiring considerable maintenance. If the computer using battery biased diodes is to be used in a device which is not easily accessible it results in a device that is not entirely dependable.

The general purpose of this invention is to provide a diode limiter circuit which embraces all the advantages of similarly employed limiter circuits and possesses none of the aforedescribed disadvantages. To attain this object, the present invention utilizes the particular characteristics of a Zener diode and a variable potentiometer thereby eliminating a battery for biasing the diode. This invention also results in a device with fewer components than previously utilized in the prior art devices.

This invention provides a device which will give better control than the prior art devices and is more dependable.

An object of this invention is to provide a new and improved limiter circuit for an analog computer.

Another object is to provide a new and improved variable limiter circuit for an analog computer.

A further object is to provide a new and improved variable limiter circuit for controlling the output voltage or input voltage of an amplifier.

Still another object is to provide a new and improved variable function generator for an analog computer.

Other objects and many of the attendant advantages will be apparent to those skilled in the art as the disclosure is made in the following detailed description of a preferred embodiment of the invention as illustrated in the accompanying sheet of drawing in which.

Figure 4:
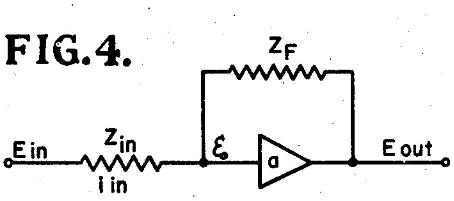

From the schematic diagram illustrated in FIG. 4 the following equations can be written:

(1) $$E\text{ out}=-\alpha\Xi$$

$$\alpha=\text{a gain of } 10\times10^6$$

(2) $$i\text{ in}=\frac{E\text{ in}-\Xi}{Z_{in}}$$

(3) $$E\text{ out}=-i\text{ in }(Z_F)+\Xi$$

(4) $$i\text{ in}=\frac{\Xi-E\text{ out}}{Z_F}$$

(5) $$\frac{E\text{ in}-\Xi}{Z_{in}}=\frac{\Xi-E\text{ out}}{Z_F}$$

(6) $$\Xi=\frac{-E\text{ out}}{\alpha}$$

Since $\Xi$ approaches zero for large values of $\alpha$ the equation may be written:

(7) $$E\text{ out}=-E\text{ in}\frac{Z_F}{Z_{in}}$$

Therefore the transfer characteristics of this amplifier are $$E\text{ out}=-E_{in}\frac{Z_F}{Z_{in}}$$

Figure 1:
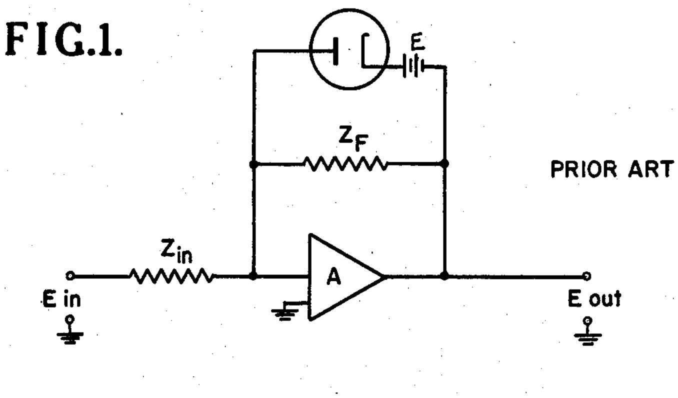
FIG. 1 is a schematic diagram of a limiter circuit used in the prior art.

In many applications it is desired that E out be limited to a given voltage. For example, in a comparator circuit for switching or for driving relays in an analog computer. The prior art utilized a diode across $Z_F$ biased to some reference voltage E, as shown in FIG. 1. When the output voltage attempted to rise above the voltage E, the diode would start conducting thereby lowering the impedance $Z_F$ to 0 thus dropping the gain of the amplifier to 0. This type of circuit requires separate power supply for each limiter that is to be used. A Zener diode could be used in this type application but it would not be adjustable as a separate power would be.

Figure 2:
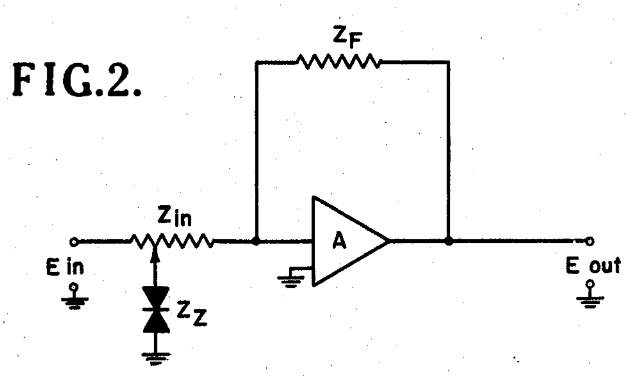
FIG. 2 is a schematic diagram of applicant's new and improved input limiter circuit for an amplifier or function generator.

Referring now to FIG. 2 in which applicant discloses a new limiter circuit, the impedance values $Z_{in}$ and $Z_F$ remain substantially the same except that $Z_{in}$ is now a variable resistor such as a potentiometer. A Zener diode is connected between the variable tap of the variable resistor and ground. The Zener may be a double anode type to limit the current in both the plus and minus directions. By using the same impedance values and connecting a Zener diode from the tap on $Z_{in}$ to ground, the same type of limiter action is available at the input. The gain characteristic of the amplifier would remain the same and the transfer function would remain the same, that is $Z_F/Z_{in}$.

When the voltage across the Zener reaches the Zener breakdown voltage, the impedance of the Zener diode will drop to zero. When the impedance drops to zero, the input voltage to the amplifier cannot increase thereby causing the amplifier output to be limited. If a low voltage Zener is chosen, of the order of two volts, it is possible to limit the output voltage to a voltage equal to the amplification of the amplifier ($Z_F/Z_{in}$) times the two volts on the Zener.

As the tap on variable resistor $Z_{in}$ is moved from the input voltage point along the resistor to the summing point of the operational amplifier the limited output of the amplifier is increased. When the Zener diode is at the summing point it will never break down because the operational amplifier maintains this voltage near zero. Therefore, when the diode tap is in the summing position there will be no limiting action.

With this type of circuit it is possible to have a continuously variable limiting output which will vary from the Zener voltage multiplied by $Z_F/Z_{in}$ up to infinity without changing the Zener diode.

The circuit shown in FIG. 2 will allow independent variable limiters on a summing amplifier for any one of several inputs by merely adding the necessary $Z_{in}$ components and the associated Zener diodes.

Figure 3:
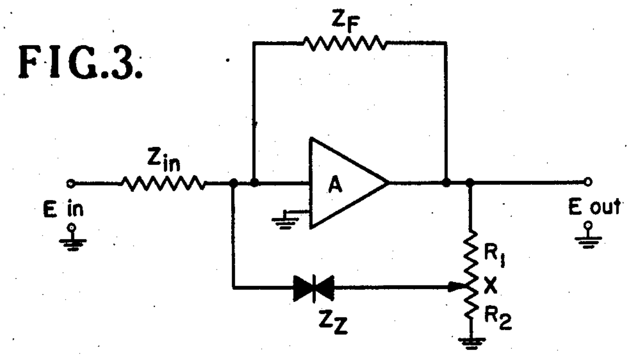
FIG. 3 is a schematic diagram of applicant's new and improved output limiter circuit.

If it is desirable to limit the output directly rather than limiting it as a function of the input voltage it is possible to place a potentometer in the output of a standard operational amplifier circuit as shown in FIG. 3. By adjusting the potentiometer on the output it is possible to feedback various voltages to the summation point of the operational amplifier. The Zener diode may be the double anode type to limit both positive and negative voltages. With this type of circuit the output voltages can be limited to any value starting with the breakdown of the Zener diode and going on up to infinity.

The output voltage will be equal to the input voltage times the ratio $Z_F/Z_{in}$ as long as the voltage at the tap point X on the potentiometer is less than the breakdown voltage of the Zener diode ($V_z$). The voltage at point X can never exceed the Zener diode breakdown voltage ($V_z$) because this would cause a voltage at the input of amplifier "A" thus causing a reduction in the output voltage and thus a reduction in the voltage at point X. If the voltage at point X is limited to $V_z$ then the output voltage of the amplifier can never exceed $V_z$ divided by the ratio $$\frac{R_2}{R_1+R_2}$$

which is determined by the setting of the potentiometer. This ratio can be varied from 0 to 1 thus giving a range of adjustment of the limited output voltage from $V_Z$ to infinity within the capabilities of the amplifier.

Thus, it is seen that applicant's novel invention provides a means for quickly and easily limiting the output or input of an operational amplifier without the use of extra batteries for biasing.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A limiter circuit for an analog computer comprising a high gain operational amplifier, an external feedback for said amplifier, an input impedance including a variable potentiometer connected to said amplifier, a double Zener diode mounted back to back and connected between said potentiometer and ground whereby the input voltage to the high gain amplifier may be varied from the voltage of the Zener diode to infinity.

2. In an analog computer a variable limiting circuit for limiting the output voltage on a high gain operational amplifier comprising a double anode Zener diode connected to the input of a high gain amplifier, said Zener diode being connected to a variable potentiometer in such a manner as to control the output voltage by controlling the input voltage.

3. A function generator comprising input terminal means having one side thereof grounded for receiving an input voltage, output terminal means, an electrical network for amplifying the input voltage and interconnecting said input terminal means with said output terminal means, a variable Zener diode limiter means connected to said input means for solely controlling the amplifier input voltage of said electrical network from a finite value to an infinite value.

4. A function generator of claim 3 wherein said input terminal means includes a variable potentiometer having a movable element settable at will to different settings, said variable Zener diode limiter means including a double anode Zener diode connected between said movable element and ground whereby the input voltage on the electrical network is varied from the break down voltage of the Zener diode to an infinite value in accordance with the instant setting of said movable element.

5. A function generator of claim 3 wherein the output terminal means includes a variable potentiometer having a movable element settable at will to different settings connected to an output terminal and ground, said variable Zener diode limiter means includes a Zener diode connected between said movable element and said input terminal means whereby the output voltage may be varied from the break down voltage of the Zener diode to an infinite value.

6. A function generator comprising input terminal means for receiving an input voltage, output terminal means, amplifying means interconnecting said input terminal and said output terminal means, an impedance connected between said input and output terminal means, a potentiometer connected to said output terminal means, and Zener diode limiting means interconnecting said potentiometer and said input terminal means whereby the output voltage may be varied from the breakdown voltage of the Zener diode to an infinite value.

References Cited in the file of this patent

UNITED STATES PATENTS

| | | |
|---|---|---|
| 2,861,239 | Gilbert | Nov. 18, 1958 |
| 2,958,832 | Clark | Nov. 1, 1960 |
| 3,008,084 | Cotton | Nov. 7, 1961 |
| 3,058,068 | Hinrichs et al. | Oct. 9, 1962 |
| 3,094,675 | Ule | June 18, 1963 |

OTHER REFERENCES

Morrill et al.: "Diode Limiters . . .," Electronics, November 1952, pp. 122 to 126 (p. 122 relied on).